US012625071B2

(12) United States Patent
Sakurai et al.

(10) Patent No.: US 12,625,071 B2
(45) Date of Patent: May 12, 2026

(54) ELECTROMAGNETIC WAVE MEASURING APPARATUS, METHOD, AND RECORDING MEDIUM

(71) Applicant: ADVANTEST CORPORATION, Tokyo (JP)

(72) Inventors: Takao Sakurai, Miyagi (JP); Nobutaka Takahashi, Miyagi (JP); Yoshinori Kikuchi, Saitama (JP)

(73) Assignee: ADVANTEST CORPORATION, Tokyo (JP)

( * ) Notice: Subject to any disclaimer, the term of this patent is extended or adjusted under 35 U.S.C. 154(b) by 249 days.

(21) Appl. No.: 18/673,739

(22) Filed: May 24, 2024

(65) Prior Publication Data

US 2025/0076191 A1     Mar. 6, 2025

(30) Foreign Application Priority Data

Aug. 29, 2023    (JP) ................................. 2023-139037

(51) Int. Cl.
| | |
|---|---|
| *G01N 21/3586* | (2014.01) |
| *G01N 21/3504* | (2014.01) |
| *G01N 22/00* | (2006.01) |

(52) U.S. Cl.
CPC ..... *G01N 21/3586* (2013.01); *G01N 21/3504* (2013.01); *G01N 22/00* (2013.01); *G01N 2021/3509* (2013.01)

(58) Field of Classification Search
CPC ........... G01N 21/3586; G01N 21/3504; G01N 22/00; G01N 2021/3509
See application file for complete search history.

(56) References Cited

U.S. PATENT DOCUMENTS

| | | | |
|---|---|---|---|
| 9,557,219 B2 * | 1/2017 | Newbury ................ | G01J 3/453 |
| 2016/0131600 A1 | 5/2016 | Pate et al. | |
| 2023/0087964 A1 | 3/2023 | Nakamura et al. | |

FOREIGN PATENT DOCUMENTS

| | | | |
|---|---|---|---|
| JP | 2016/521859 | 7/2016 | |
| WO | 2021/261240 | 12/2021 | |
| WO | WO-2021261240 A1 * | 12/2021 | ............. G01S 17/32 |

OTHER PUBLICATIONS

Albert Schliesser et al., "Frequency-comb infrared spectrometer for rapid, remote chemical sensing", Optics Express, 2005, vol. 13, Issue 22, pp. 9029-9038.

(Continued)

*Primary Examiner* — Uzma Alam
*Assistant Examiner* — Fani Polyzos Boosalis
(74) *Attorney, Agent, or Firm* — GREENBLUM & BERNSTEIN, P.L.C.

(57) ABSTRACT

An electromagnetic wave measuring apparatus irradiates an irradiation target having a measuring target with a pre-irradiation electromagnetic wave and, based on a post-irradiation electromagnetic wave obtained, measures the measuring target. The post-irradiation electromagnetic wave has a response component from the measuring target and a background component corresponding to the pre-irradiation electromagnetic wave. The electromagnetic wave measuring apparatus includes a first frequency spectrum acquiring section, a second frequency spectrum acquiring section, and a subtracting section. The first frequency spectrum acquiring section acquires a frequency spectrum of a first signal that includes the background component and the response component of the post-irradiation electromagnetic wave. The second frequency spectrum acquiring section acquires a frequency spectrum of a second signal that includes the background component of the post-irradiation electromag- (Continued)

netic wave. The subtracting section subtracts the frequency spectrum of the second signal from the frequency spectrum of the first signal.

15 Claims, 4 Drawing Sheets

(56)                 References Cited

OTHER PUBLICATIONS

S. Okubo et al., "Ultra-broadband dual-comb spectroscopy across 1.0-1.9μm", Applied Physics Express, 2015, 8, pp. 082402.
G. B. Rieker et al., "Frequency-comb-based remote sensing of greenhouse gases over kilometer air paths", Optica, 2014, vol. 1, issue 5, pp. 290-298.

* cited by examiner

16

Signal

Time

X

A: Background Component
B: Response Component
X: Non-Signal Component
C: Part of Non-Signal Component

ELECTROMAGNETIC WAVE MEASURING APPARATUS, METHOD, AND RECORDING MEDIUM

BACKGROUND OF THE INVENTION

Field of the Invention

The present invention relates to measuring frequency spectrum.

Description of the Related Art

There has conventionally been known acquiring a signal including free induction decay (FID) that is generated after pulse excitation of gas and, based on its frequency spectrum, measuring the concentration of a predetermined gas component (see Patent Literature 2, for example). In this frequency spectrum, absorption is observed at a predetermined frequency that corresponds to the predetermined gas component.

In order to obtain the depth of the absorption, it is necessary to obtain a component in the frequency spectrum that does not depend on the predetermined gas to be measured (this may hereinafter be referred to as "baseline").

In order to obtain a baseline, there has been known designating a path through which a pulse passes (which shall not pass through a gas cell with gas housed therein) as a reference path (the reference path may be designated by removing the gas cell from a signal path to be described hereinafter), and measuring the frequency spectrum of the pulse that has passed through the reference path for designation as a baseline (see Patent Literature 1, Patent Literature 3, and Non-Patent Literature 1, for example). However, since the reference path is different from the signal path, through which the pulse passes (which shall pass through the gas cell), it is not always possible to obtain the baseline accurately due to difference in the condition such as pulse reflection in the paths.

In order to obtain a baseline, there has alternatively been known designating a path through which a pulse passes (which shall pass through a gas cell with gas removed therefrom (or an empty cell with no gas housed therein)) as a reference path, and measuring the frequency spectrum of the pulse that has passed through the reference path for designation as a baseline (see Non-Patent Literature 2, for example). However, it is time consuming to remove gas from the gas cell, and the baseline may fluctuate due to such a lapse of time.

In order to obtain a baseline, there has further been known approximating a baseline by a polynomial for each narrower frequency range in view of the fact that the baseline fluctuates slowly in a narrower frequency range (see Non-Patent Literature 3, for example).

CITATION LIST

[Patent Literature 1] WO2021/261240
[Patent Literature 2] Japanese Patent Application Publication No. 2016-521859
[Patent Literature 3] U.S. Pat. No. 9,557,219
[Non-Patent Literature 1] Albert Schliesser, et. al. "Frequency-comb infrared spectrometer for rapid, remote chemical sensing", Optics Express, 2005, Vol. 13, Issue 22 p. 9029-9038

[Non-Patent Literature 2]S. Okubo, et. al., "Ultra-broadband dual-comb spectroscopy across 1.0-1.9 m", Applied Physics Express, 2015, 8, 082402
[Non-Patent Literature 3]G. B. Rieker, F. R. Giorgetta, W. C. Swann, et. al., "Frequency-comb-based remote sensing of greenhouse gases over kilometer air paths", Optica, 2014, Vol. 1, Issue 5, p. 290-298

SUMMARY OF THE INVENTION

However, in order to approximate a baseline by a polynomial, it is necessary to repeatedly approximate the baseline for each narrower frequency range many times, which may be a cumbersome approach.

It is hence an object of the present invention to make it easy to obtain a component (a so-called baseline) in the frequency spectrum that does not depend on a measuring target.

According to the present invention, an electromagnetic wave measuring apparatus arranged to irradiate an irradiation target having a measuring target with a pre-irradiation electromagnetic wave and, based on a post-irradiation electromagnetic wave obtained, measure the measuring target, in which the post-irradiation electromagnetic wave has a response component from the measuring target and a background component corresponding to the pre-irradiation electromagnetic wave, includes: a first frequency spectrum acquiring section arranged to acquire a frequency spectrum of a first signal that includes the background component and the response component of the post-irradiation electromagnetic wave; a second frequency spectrum acquiring section arranged to acquire a frequency spectrum of a second signal that includes the background component of the post-irradiation electromagnetic wave; and a subtracting section arranged to subtract the frequency spectrum of the second signal from the frequency spectrum of the first signal.

According to the thus constructed electromagnetic wave measuring apparatus, the electromagnetic wave measuring apparatus is arranged to irradiate an irradiation target having a measuring target with a pre-irradiation electromagnetic wave and, based on a post-irradiation electromagnetic wave obtained, measure the measuring target. The post-irradiation electromagnetic wave has a response component from the measuring target and a background component corresponding to the pre-irradiation electromagnetic wave. A first frequency spectrum acquiring section is arranged to acquire a frequency spectrum of a first signal that includes the background component and the response component of the post-irradiation electromagnetic wave. A second frequency spectrum acquiring section is arranged to acquire a frequency spectrum of a second signal that includes the background component of the post-irradiation electromagnetic wave. A subtracting section is arranged to subtract the frequency spectrum of the second signal from the frequency spectrum of the first signal.

According to the electromagnetic wave measuring apparatus of the present invention, the post-irradiation electromagnetic wave may further have a non-signal component that is neither the background component nor the response component, and the second signal may further include at least a part of the non-signal component.

According to the electromagnetic wave measuring apparatus of the present invention, a length of time of the first signal may be equal to a length of time of the second signal.

According to the electromagnetic wave measuring apparatus of the present invention, the post-irradiation electromagnetic wave may further have a non-signal component that is neither the background component nor the response component, and the first signal may further include at least a part of the non-signal component.

According to the electromagnetic wave measuring apparatus of the present invention, a waveform of the post-irradiation electromagnetic wave may be acquired by dual-comb spectroscopy.

According to the electromagnetic wave measuring apparatus of the present invention, a waveform of the post-irradiation electromagnetic wave may be acquired by tera-hertz time domain spectroscopy.

According to the electromagnetic wave measuring apparatus of the present invention, a waveform of the post-irradiation electromagnetic wave may be acquired by pump-probe method.

According to the electromagnetic wave measuring apparatus of the present invention, the response component may be a free induction decay signal.

According to the electromagnetic wave measuring apparatus of the present invention, the irradiation target may be gas.

According to the electromagnetic wave measuring apparatus of the present invention, the irradiation target may be housed in a gas cell.

According to the electromagnetic wave measuring apparatus of the present invention, the electromagnetic wave measuring apparatus may be arranged to measure a concentration of the measuring target.

According to the electromagnetic wave measuring apparatus of the present invention, the irradiation target may be liquid or solid.

According to the electromagnetic wave measuring apparatus of the present invention, the electromagnetic wave measuring apparatus may be arranged to measure a presence of the measuring target.

According to the present invention, an electromagnetic wave measuring method for irradiating an irradiation target having a measuring target with a pre-irradiation electromagnetic wave and, based on a post-irradiation electromagnetic wave obtained, measuring the measuring target, in which the post-irradiation electromagnetic wave has a response component from the measuring target and a background component corresponding to the pre-irradiation electromagnetic wave, includes: acquiring a frequency spectrum of a first signal that includes the background component and the response component of the post-irradiation electromagnetic wave; acquiring a frequency spectrum of a second signal that includes the background component of the post-irradiation electromagnetic wave; and subtracting the frequency spectrum of the second signal from the frequency spectrum of the first signal.

The present invention is a non-transitory computer-readable medium including a program of instructions for execution by a computer to perform an electromagnetic wave measuring process for irradiating an irradiation target having a measuring target with a pre-irradiation electromagnetic wave and, based on a post-irradiation electromagnetic wave obtained, measuring the measuring target, in which the post-irradiation electromagnetic wave has a response component from the measuring target and a background component corresponding to the pre-irradiation electromagnetic wave, the electromagnetic wave measuring process, including: acquiring a frequency spectrum of a first signal that includes the background component and the response component of the post-irradiation electromagnetic wave; acquiring a frequency spectrum of a second signal that includes the background component of the post-irradiation electromagnetic wave; and subtracting the frequency spectrum of the second signal from the frequency spectrum of the first signal.

DESCRIPTION OF THE PREFERRED EMBODIMENT

A preferred embodiment of the present invention will hereinafter be described with reference to the accompanying drawings.

Figure 1:
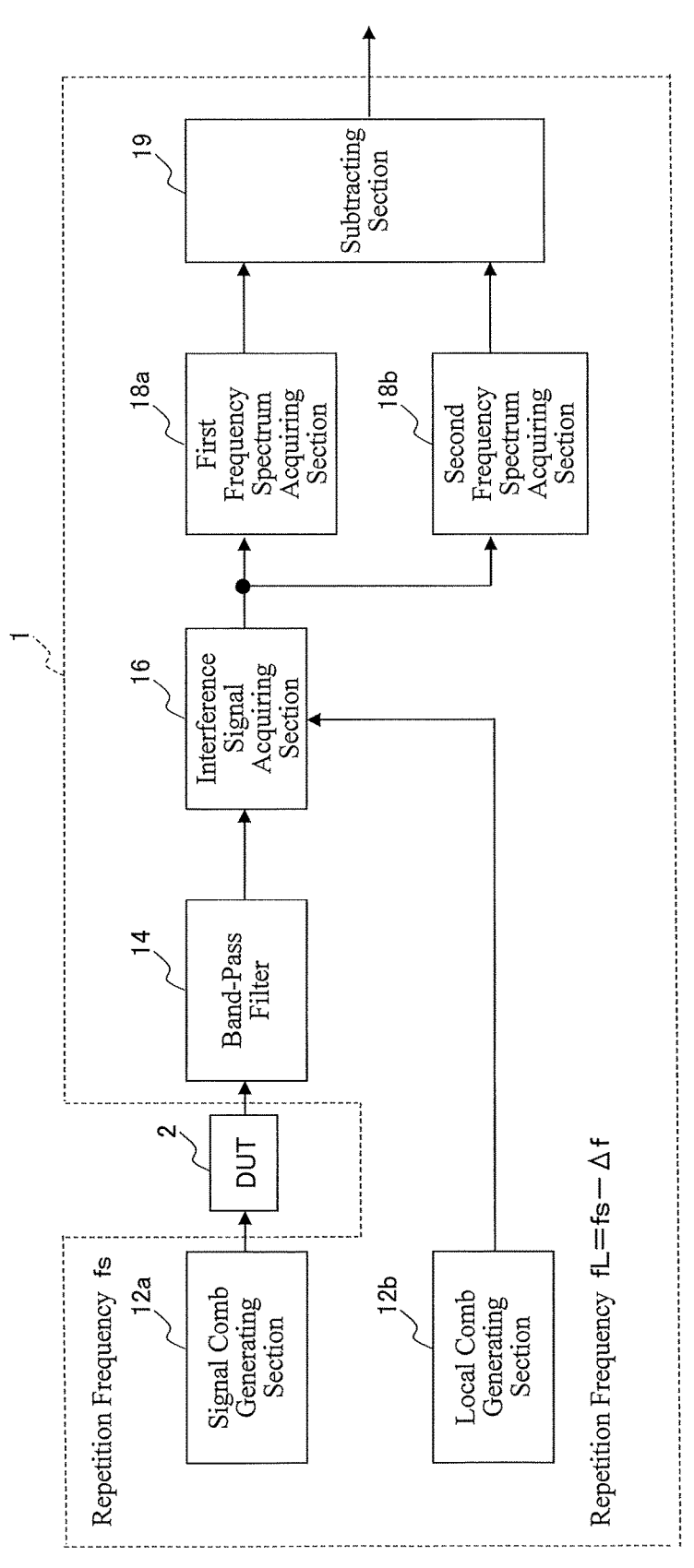
FIG. 1 shows the configuration of an electromagnetic wave measuring apparatus 1 according to an embodiment of the present invention.

FIG. 1 shows the configuration of an electromagnetic wave measuring apparatus 1 according to an embodiment of the present invention. The electromagnetic wave measuring apparatus 1 according to the embodiment of the present invention is arranged to measure an irradiation target having a measuring target.

For example, the irradiation target is gas housed in a gas cell (DUT 2 in the embodiment of the present invention). In more detail, gas flows into and out of the gas cell. It is noted that the gas has a measuring target (e.g. molecules in the gas). The electromagnetic wave measuring apparatus 1 may also be arranged to measure the concentration of the measuring target. The method of measuring the concentration of the measuring target is well known and will not be described.

The electromagnetic wave measuring apparatus 1 according to the embodiment of the present invention includes a signal comb generating section 12a, a local comb generating section 12b, a band-pass filter 14, an interference signal acquiring section 16, a first frequency spectrum acquiring section 18a, a second frequency spectrum acquiring section 18b, and a subtracting section 19.

The signal comb generating section 12a is arranged to generate a pre-irradiation signal comb (a pre-irradiation electromagnetic wave before irradiation of the irradiation target). The local comb generating section 12b is arranged to generate a local comb. The pre-irradiation signal comb and the local comb are optical combs. Irradiating the irradiation target housed in the DUT 2 with the pre-irradiation electromagnetic wave causes a post-irradiation electromagnetic wave to be obtained. The electromagnetic wave measuring apparatus 1 is arranged to measure the measuring target based on the post-irradiation electromagnetic wave. The waveform of the post-irradiation electromagnetic wave is acquired by dual-comb spectroscopy.

For example, the pre-irradiation signal comb has a repetition frequency of fs. For example, the local comb has a repetition frequency of fL. Note here that the local comb is set to be different from the repetition frequency fs of the pre-irradiation signal comb by a predetermined differential frequency $\Delta f (=fs-fL)$. It is noted that the frequencies of the pre-irradiation signal comb and the local comb are roughly the frequency of light.

The pre-irradiation signal comb, when the irradiation target (gas) within the DUT (gas cell) 2 is irradiated therewith, penetrates through the DUT 2 to be a post-irradiation signal comb (post-irradiation electromagnetic wave). Like the pre-irradiation signal comb, the post-irradiation signal comb is also an optical comb. It is noted that the post-irradiation signal comb is provided to the band-pass filter 14 and components that have passed therethrough are provided to the interference signal acquiring section 16.

It is assumed that the power of light with which the irradiation target within the DUT 2 is irradiated changes to be lower (implying light absorption) at a predetermined frequency corresponding to the measuring target.

The band-pass filter 14 is arranged to pass a signal of a band near the predetermined frequency corresponding to the measuring target. Note here that the passband of the band-pass filter 14 is set to be equal to or lower than a predetermined value to reduce aliasing.

That is, the frequency difference between the post-irradiation signal comb and the local comb increases in steps of $\Delta f$ like 0, $\Delta f$, $2\Delta f$, . . . , while decreases in steps of $\Delta f$ after the maximum value $fL/2$ is reached. The passband of the band-pass filter 14 is hence set such that the frequency difference between the post-irradiation signal comb and the local comb is equal to or higher than zero but equal to or lower than $fL/2$ or equal to or higher than $fL/2$ but equal to or lower than $fL$.

For example, a case is considered in which when the frequency of the post-irradiation signal comb is mfs (where m is a positive integer), it is equal to the frequency of the local comb. In this case, the passband of the band-pass filter 14 is within the range from the frequency mfs to the frequency mfs+(1/2) Mfs (where $M\Delta f=fL$ and M is a positive integer). Note here that mfs<(the predetermined frequency corresponding to the measuring target)<mfs+(1/2) Mfs.

The interference signal acquiring section 16 is arranged to acquire an interference signal between the post-irradiation signal comb and the local comb. Since the predetermined differential frequency $\Delta f$ has a relatively low value, the post-irradiation signal comb and the local comb generate beats. The interference signal acquiring section 16 is, for example, an optical coupler, the interference signal acquiring section 16 arranged to be provided with the post-irradiation signal comb and the local comb through the polarization maintaining fiber and an optical attenuator.

The interference signal can be said to be a result of the waveform of the post-irradiation electromagnetic wave acquired by pump-probe method.

Figure 2:
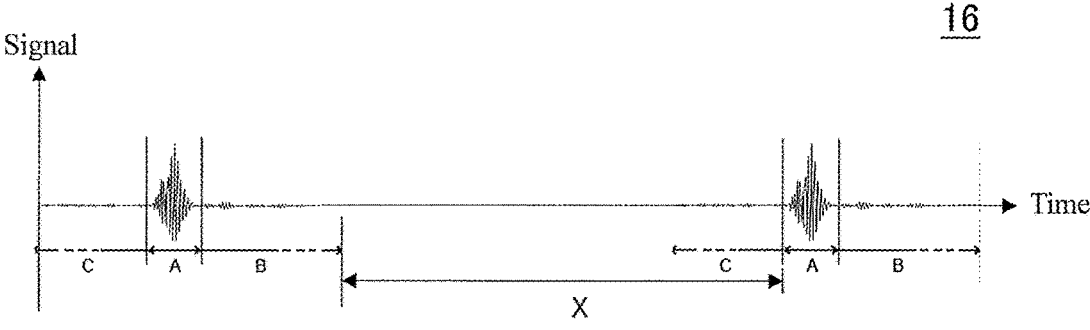
FIG. 2 shows a waveform of an interference signal.

FIG. 2 shows the waveform of the interference signal. Note here that in FIG. 2, the vertical axis represents signal (e.g. in voltage [V]), while the horizontal axis represents time (e.g. in millisecond).

The post-irradiation signal comb (post-irradiation electromagnetic wave) has a response component from the measuring target, a background component corresponding to the pre-irradiation signal comb (pre-irradiation electromagnetic wave), and a non-signal component that is neither the background component nor the response component.

In the waveform of the interference signal, a portion A with a relatively large signal corresponds to the background component. A portion B with a relatively small signal immediately after the background component A corresponds to the response component. The response component B is a free induction decay (FID) signal emitted from the measuring target upon excitation under a photoelectric field. While the background component A and the response component B appear repeatedly, a non-signal component X, which is neither the background component A nor the response component B, appears between the response component B and the following background component A. It is noted that a part of the non-signal component is labeled C. Note here that the part C of the non-signal component appears immediately before the background component A.

The first frequency spectrum acquiring section 18a is arranged to acquire the frequency spectrum of a first signal that includes the background component A and the response component B of the post-irradiation electromagnetic wave. The second frequency spectrum acquiring section 18b is arranged to acquire the frequency spectrum of a second signal that includes the background component A of the post-irradiation electromagnetic wave. It is noted that the second signal further includes the part C of the non-signal component. It is noted that the length of time of the second signal is equal to or greater than the length of time of the first signal. However, since it is preferable that the length of time of the first signal is equal to the length of time of the second signal, the following description will continue on the assumption that they are equal. It is noted that the first frequency spectrum acquiring section 18a and the second frequency spectrum acquiring section 18b are each arranged to obtain the frequency spectrum by integrating and Fourier transforming interference signals.

Figure 3A:
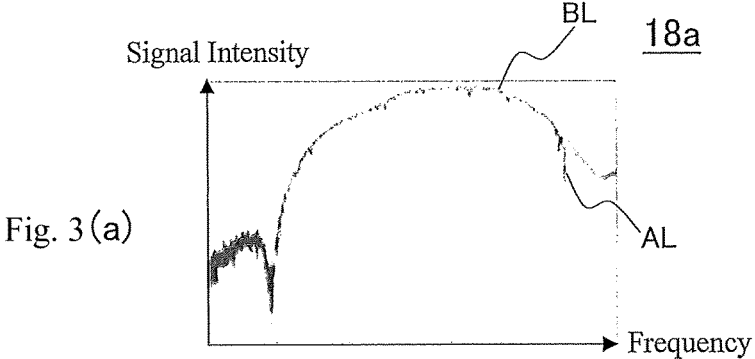
FIGS. 3(a) and 3(b) show a frequency spectrum of a first signal acquired by a first frequency spectrum acquiring section 18a (FIG. 3(a)) and a frequency spectrum of a second signal acquired by a second frequency spectrum acquiring section 18b (FIG. 3(b))
Figure 3B:
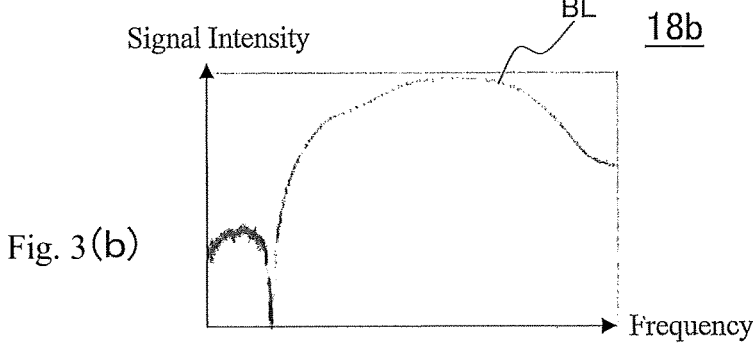

FIG. 3 shows the frequency spectrum of the first signal acquired by the first frequency spectrum acquiring section 18a (FIG. 3(a)) and the frequency spectrum of the second signal acquired by the second frequency spectrum acquiring section 18b (FIG. 3(b)). Note here that in FIG. 3, the vertical axis represents signal intensity [dB], while the horizontal axis represents frequency [Hz].

Referring to FIG. 3(a), the frequency spectrum of the first signal includes a component (a so-called baseline) BL that does not depend on the measuring target and a component (an absorption line) AL that depends on the measuring target in the frequency spectrum of the post-irradiation electromagnetic wave. Since the baseline BL is curved, the depth of the absorption line AL cannot be recognized precisely.

Referring to FIG. 3(b), the frequency spectrum of the second signal includes a component (a so-called baseline) BL that does not depend on the measuring target but not a component (an absorption line) AL that depends on the measuring target in the frequency spectrum of the post-irradiation electromagnetic wave.

The subtracting section 19 is arranged to subtract the frequency spectrum of the second signal (see FIG. 3(b)) from the frequency spectrum of the first signal (see FIG. 3(a)).

Figure 4:
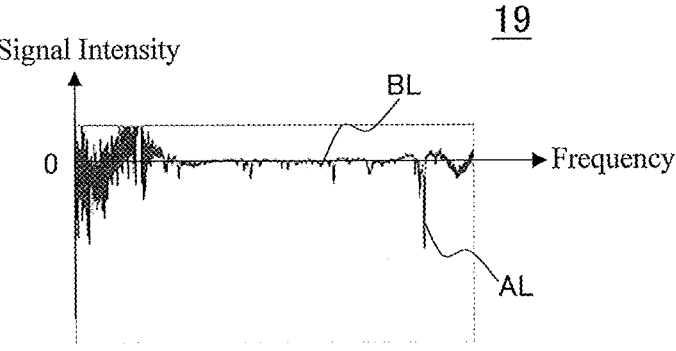
FIG. 4 shows an output from a subtracting section 19.

FIG. 4 shows an output from the subtracting section 19. The baseline BL is generally linear with a signal intensity of 0, and the depth of the absorption line AL can be recognized precisely.

Next will be described an operation according to the embodiment of the present invention.

A pre-irradiation signal comb, when an irradiation target (gas) within the DUT (gas cell) 2 is irradiated therewith from the signal comb generating section 12a, penetrates through the DUT 2 to be a post-irradiation signal comb.

The post-irradiation signal comb is provided to the band-pass filter 14 and components that have passed therethrough are provided to the interference signal acquiring section 16.

A local comb is also provided from the local comb generating section 12b to the interference signal acquiring section 16.

An interference signal between the post-irradiation signal comb (components passing through the band-pass filter 14) and the local comb is acquired by the interference signal acquiring section 16. From the result of acquisition by the interference signal acquiring section 16, the frequency spectrum of the first signal (see FIG. 3(*a*); including the absorption line AL) is measured by the first frequency spectrum acquiring section 18*a*, while the frequency spectrum of the second signal (see FIG. 3(*b*); excluding the absorption line AL) is measured by the second frequency spectrum acquiring section 18*b*.

The subtracting section 19 subtracts the frequency spectrum of the second signal (see FIG. 3(*b*)) from the frequency spectrum of the first signal (see FIG. 3(*a*)) (see FIG. 4). As a result of subtraction by the subtracting section 19 (see FIG. 4), the baseline BL is generally linear with a signal intensity of 0, and the depth of the absorption line AL can be recognized precisely. From the depth of the absorption line AL, the concentration of the measuring target can be derived by Lambert-Beer's law.

In accordance with the embodiment of the present invention, there is no need to provide a reference path or to approximate the baseline for each narrower frequency range, which can facilitate acquisition of the baseline.

In addition, since the length of time (A+B) of the first signal is equal to the length of time (C+A) of the second signal, the number of points for Fourier transform upon acquisition of the second signal can be increased, resulting in an increase in the accuracy of acquisition of the baseline BL.

It is noted that the embodiment of the present invention can have the following various variations.

<First Variation>

For example, the second signal may not include the part C of the non-signal component. In this case, the accuracy of acquisition of the baseline BL may be reduced, but it does not mean that the baseline BL cannot be acquired.

<Second Variation>

The first signal may further include the part C of the non-signal component.

<Third Variation>

The irradiation target may be liquid or solid. For example, the presence of the measuring target is measured. For example, an FTIR is used, as an example in which the irradiation target is solid, to measure absorption (1.4 um band) by OH groups of an optical fiber. Alternatively, an FTIR is used, as an example in which the irradiation target is liquid, to determine, for example, whether water is contained based on whether or not absorption by OH groups occurs.

<Fourth Variation>

The waveform of the post-irradiation electromagnetic wave may be acquired by terahertz time domain spectroscopy instead of dual-comb spectroscopy. In this case, the signal comb generating section 12*a* and the local comb generating section 12*b* are replaced, respectively, with terahertz generators (which have their respective different repetition frequencies), and the interference signal acquiring section 16 is replaced with a terahertz detector.

Note here that the signal comb generating section 12*a* and the local comb generating section 12*b* may be replaced, respectively, with terahertz generators having the same repetition frequency, and the interference signal acquiring section 16 may be replaced with a terahertz detector. In this case, a unit that can sweep the delay time is required between the terahertz generator with which the local comb generating section 12*b* is replaced and the terahertz detector with which the interference signal acquiring section 16 is replaced.

<Fifth Variation>

The DUT 2 may be irradiated not with light or terahertz waves but with RF or magnetism.

The above-described embodiment may also be implemented as follows. A computer including a CPU, a hard disk, and a medium (USB memory, CD-ROM, or the like) reading device is caused to read a medium with a program recorded thereon that achieves the above-described components (e.g. the first frequency spectrum acquiring section 18*a*, the second frequency spectrum acquiring section 18*b*, and the subtracting section 19) and install the program in the hard disk. The above-described features can also be achieved in this manner.

DESCRIPTION OF REFERENCE NUMERALS

1 Electromagnetic Wave Measuring Apparatus
2 DUT (Gas Cell)
12*a* Signal Comb Generating Section
12*b* Local Comb Generating Section
14 Band-Pass Filter
16 Interference Signal Acquiring Section
18*a* First Frequency Spectrum Acquiring Section
18*b* Second Frequency Spectrum Acquiring Section
19 Subtracting Section
A Background Component
B Response Component
X Non-Signal Component
C Part of Non-Signal Component X

What is claimed is:

1. An electromagnetic wave measuring apparatus arranged to irradiate an irradiation target having a measuring target with a pre-irradiation electromagnetic wave and, based on a post-irradiation electromagnetic wave obtained, measure the measuring target, in which
the post-irradiation electromagnetic wave has a response component from the measuring target and a background component corresponding to the pre-irradiation electromagnetic wave,
the electromagnetic wave measuring apparatus, comprising:
a first frequency spectrum acquiring section arranged to acquire a frequency spectrum of a first signal that includes the background component and the response component of the post-irradiation electromagnetic wave;
a second frequency spectrum acquiring section arranged to acquire a frequency spectrum of a second signal that includes the background component of the post-irradiation electromagnetic wave; and
a subtracting section arranged to subtract the frequency spectrum of the second signal from the frequency spectrum of the first signal.

2. The electromagnetic wave measuring apparatus according to claim 1, wherein
the post-irradiation electromagnetic wave further has a non-signal component that is neither the background component nor the response component, and
the second signal further includes at least a part of the non-signal component.

3. The electromagnetic wave measuring apparatus according to claim 2, wherein
a length of time of the first signal is equal to a length of time of the second signal.

4. The electromagnetic wave measuring apparatus according to claim 1, wherein the post-irradiation electromagnetic wave further has a non-signal component that is neither the background component nor the response component, and the first signal further includes at least a part of the non-signal component.

5. The electromagnetic wave measuring apparatus according to claim 1, wherein a waveform of the post-irradiation electromagnetic wave is acquired by dual-comb spectroscopy.

6. The electromagnetic wave measuring apparatus according to claim 1, wherein a waveform of the post-irradiation electromagnetic wave is acquired by terahertz time domain spectroscopy.

7. The electromagnetic wave measuring apparatus according to claim 1, wherein a waveform of the post-irradiation electromagnetic wave is acquired by pump-probe method.

8. The electromagnetic wave measuring apparatus according to claim 1, wherein the response component is a free induction decay signal.

9. The electromagnetic wave measuring apparatus according to claim 1, wherein the irradiation target is gas.

10. The electromagnetic wave measuring apparatus according to claim 9, wherein the irradiation target is housed in a gas cell.

11. The electromagnetic wave measuring apparatus according to claim 10, wherein the electromagnetic wave measuring apparatus is arranged to measure a concentration of the measuring target.

12. The electromagnetic wave measuring apparatus according to claim 1, wherein the irradiation target is liquid or solid.

13. The electromagnetic wave measuring apparatus according to claim 12, wherein the electromagnetic wave measuring apparatus is arranged to measure a presence of the measuring target.

14. An electromagnetic wave measuring method for irradiating an irradiation target having a measuring target with a pre-irradiation electromagnetic wave and, based on a post-irradiation electromagnetic wave obtained, measuring the measuring target, in which the post-irradiation electromagnetic wave has a response component from the measuring target and a background component corresponding to the pre-irradiation electromagnetic wave, the electromagnetic wave measuring method, comprising:

acquiring a frequency spectrum of a first signal that includes the background component and the response component of the post-irradiation electromagnetic wave;

acquiring a frequency spectrum of a second signal that includes the background component of the post-irradiation electromagnetic wave; and subtracting the frequency spectrum of the second signal from the frequency spectrum of the first signal.

15. A non-transitory computer-readable medium including a program of instructions for execution by a computer to perform an electromagnetic wave measuring process for irradiating an irradiation target having a measuring target with a pre-irradiation electromagnetic wave and, based on a post-irradiation electromagnetic wave obtained, measuring the measuring target, in which the post-irradiation electromagnetic wave has a response component from the measuring target and a background component corresponding to the pre-irradiation electromagnetic wave, the electromagnetic wave measuring process, comprising:

acquiring a frequency spectrum of a first signal that includes the background component and the response component of the post-irradiation electromagnetic wave;

acquiring a frequency spectrum of a second signal that includes the background component of the post-irradiation electromagnetic wave; and subtracting the frequency spectrum of the second signal from the frequency spectrum of the first signal.

\* \* \* \* \*